United States Patent [19]

Fujiwara et al.

[11] Patent Number: 4,714,945

[45] Date of Patent: Dec. 22, 1987

[54] LIGHT EXPOSURE CONTROLLER

[75] Inventors: Katsuyoshi Fujiwara, Osaka; Shunju Anzai, Nara, both of Japan

[73] Assignee: Sharp Kabushiki Kaisha, Osaka, Japan

[21] Appl. No.: 810,244

[22] Filed: Dec. 18, 1985

[30] Foreign Application Priority Data

Dec. 20, 1984 [JP] Japan ................................ 59-271468

[51] Int. Cl.[4] ................................................ G03B 27/72

[52] U.S. Cl. ...................................... 355/69; 355/14 E

[58] Field of Search ............... 355/68, 69, 14 E, 14 R, 355/77

[56] References Cited

U.S. PATENT DOCUMENTS 4,542,985 9/1985 Honma et al. .................... 355/69 X 4,640,603 2/1987 Honma ......................... 355/14 E X

*Primary Examiner*—L. T. Hix

*Assistant Examiner*—D. Rutledge

*Attorney, Agent, or Firm*—Birch, Stewart, Kolasch & Birch

[57] ABSTRACT

A light exposure controller is provided for detecting a light amount reflected by an original document in a copying machine and controlling the light volume of a copy lamp illuminating the original document according to the detected light amount. The light exposure controller has an auto/manual control mode selector switch. When the automatic control mode is switched over to the manual mode, the light volume is set at a mean value of the light volume for the last automatic control mode copying operation.

4 Claims, 5 Drawing Figures

LIGHT EXPOSURE CONTROLLER

BACKGROUND OF THE INVENTION

The present invention relates to an exposure controller of a copying machine and more specifically to an exposure controller that can control light exposure either manually or automatically.

An electrophotographic copying machine has charging, exposing, developing, transferring, charge-removing and cleaning devices arranged around a photoreceptor as a recording medium to form an image corresponding to that of an original document onto a copy paper. In the copying process, light exposure is controlled to develop an image of adequate density. The most typical method for the light exposure control is to control the copy lamp light volume in illuminating the original document. The smaller light volume results in a darker image and the larger light volume results in a thinner or lighter image. If the copy lamp light volume is adjusted according to the print density on the original document, a copy with a clear image of an adequate density can be constantly obtained.

Conventionally, the copy lamp light volume is adjusted manually by a light exposure control lever according to the print density of the original document. However, such adjustment by guessing often results in an inadequate light volume adjustment. To avoid such an inadequate adjustment, an automatic light exposure control has been proposed and put into practice. According to the proposed automatic control method, the light reflected by the original document is detected to control the line voltage to be applied to the copy lamp accordingly. Since copy lamp light volume is controlled to be suited to the print density of the original document, the possibility of improper light volume adjustment is eliminated.

In some copying machines, an automatic or manual light exposure control mode can be discretionally selected. With the automatic control mode, the image is copied with the optimal density as long as the print density is uniform over the entire original document. If the print density varies greatly such as the case with a photograph, the copy lamp light volume tends to be automatically set for the darker area of the original document, so the lighter area of the document cannot be copied clearly. In such a case, it is necessary to switch over the automatic control mode to the manual mode, enabling the operator to manually adjust the copy lamp light volume. In the light exposure controller, however, the light volume is automatically set at the medium value when the automatic control mode is switched over to the manual mode. This makes it difficult for the operator to determine which side (the lighter side or the darker side) the light volume should be adjusted to. As a result, the copy lamp light volume can be inadequately adjusted, causing a copy image of improper density. In some light exposure controllers, the light volume is automatically adjusted at the value set for the last manual control mode copying operation when the automatic control mode is switched over to the manual mode. In this case as well, proper light exposure control is difficult for the same reason as above.

SUMMARY OF THE INVENTION

It is the object of the present invention to provide a light exposure controller that is capable of controlling the copy lamp light volume manually or automatically and in which the light volume can be easily and adequately adjusted when the automatic control mode is switched over to the manual control mode.

Other objects and further scope of applicability of the present invention will become apparent from the detailed description given hereinafter. It should be understood, however, that the detailed description and specific examples, while indicating preferred embodiments of the invention, are given by way of illustration only; various changes and modifications within the spirit and scope of the invention will become apparent to those skilled in the art from this detailed description.

To achieve the above objects, according to a preferred embodiment of the invention, a light exposure controller which detects light reflected by an original document loaded on a copying machine and accordingly controls the light volume of the copy lamp illuminating the original document is characterized in that it has an auto/manual mode selector switch means and that, when the automatic mode is switched over to the manual mode, the light volume is set at a mean value of the light volume for the last automatic control mode copying operation.

BRIEF DESCRIPTION OF THE DRAWINGS

The present invention will be better understood from the detailed description given hereinbelow and the accompanying drawings which are given by way of illustration only, and thus are not limitative of the present invention in which.

DESCRIPTION OF THE INVENTION

Figure 1:
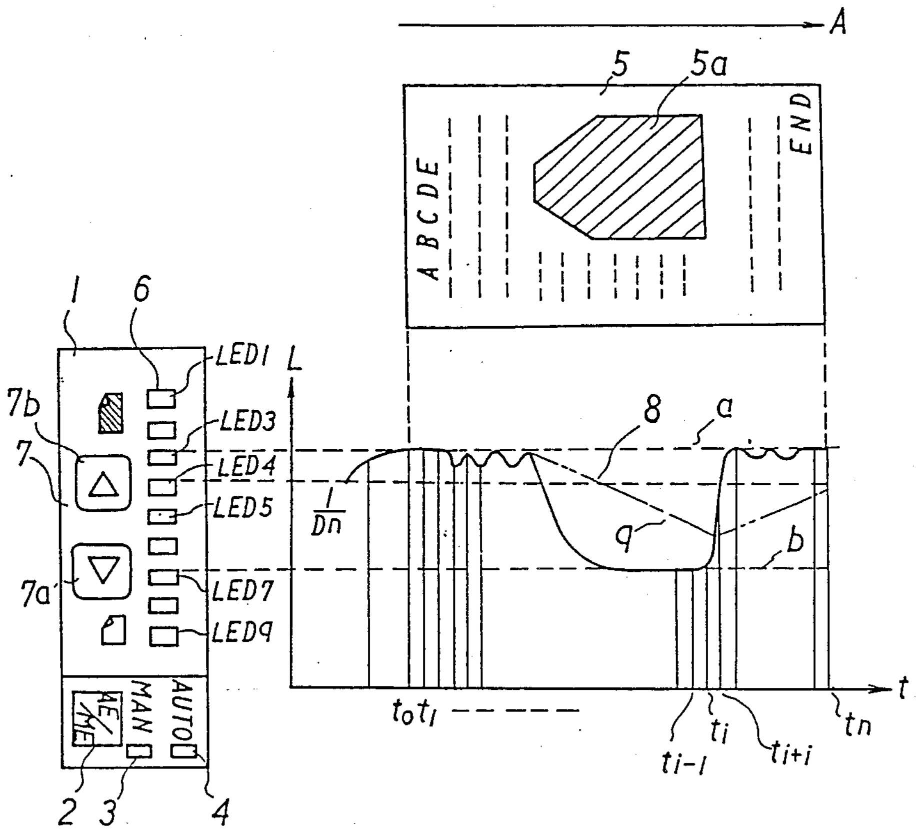
FIG. 1 shows the relationship between the reflected light amount in optical document scanning and the corresponding light exposure indication.

FIG. 1 shows the relationship between the reflected light amount in optical document scanning and the corresponding light exposure indication. Reference numeral 1 is a light exposure control panel which has an auto (AE)/manual (ME) mode selector switch 2 for light exposure control. The panel 1 is provided on the operation panel for controlling the copying machine. When the selector switch 2 is operated in the automatic exposure control mode, the control mode is switched over to the manual mode, and a MANU mode indicator 3 is illuminated. When the selector switch 2 is operated in the manual exposure control mode, the control mode is switched over to the automatic mode and AUTO mode indicator 4 is illuminated. Unless the selector switch 2 is operated, the current control mode is retained. Light emitting diodes (LED) are embedded in the mode indicators 3 and 4.

The panel 1 also contains a display 6 for indication of the copy lamp light volume in illuminating the original document 5. The display 6 is divided into nine steps for indication. Light emitting diodes are also used in the display 6. Manual adjusting keys 7 are provided on the panel 1 for manual light exposure adjustment. The manual adjusting keys 7 include a "+" key 7a and a "−"

key 7*b*. The copy lamp light volume increases by depressing the "+" key 7*a* and decreases by depressing the "−" key 7*b*. The indication on the display 6 moves downward as the light volume increases whereas it moves upward as the light volume decreases. For an original document 5 with low density print, for instance, appropriate light exposure is obtained by depressing the "−" key 7*b*. In this embodiment of the invention, the light exposure is controllable in nine steps. This nine-step control is just an example and not limitative of the invention. Light exposure may be controlled steplessly or in fewer steps.

As shown in the figure, the original document 5 is not of a uniform print density, having a photographic area 5*a*. The original document 5 is placed on the document table of the copying machine with the print side facing the document table. The document 5 is illuminated by the copy lamp installed under the document table. The light reflected by the document surface is led via optical means to a photoreceptor as a recording medium. That is, the original document 5 is scanned by the optical means which moves together with the copy lamp in the direction indicated by the arrow A, so that the image of the original document 5 is sequentially formed on the photoreceptor. According to the present invention, a silicon blue cell is provided near the copy lamp. In the automatic exposure control mode, the silicon blue cell catches the light reflected by the original document 5 and accordingly controls the copy lamp light volume. The curve 8 in FIG. 1 represents the output characteristics of the silicon blue cell in scanning the original document 5. The light amount reflected the area other than the photographic area 5*a* of the original document is greater than that reflected by the photographic area 5*a*. When the original document reflects a large amount of light, the silicon blue cell detects it and lowers the copy lamp line voltage to reduce the light volume. For instance, if the silicon blue cell detects the reflected light amount indicated by "a" in FIG. 1, the copy lamp light volume is adjusted to the value corresponding to LED 3 of the display 6. If the silicon blue cell detects the reflected light amount indicated by "b", the copy lamp light volume is adjusted to the value corresponding to LED 7. This adjustment is performed only in the automatic exposure control mode.

The light exposure controller has the construction described above. According to the present invention, when the automatic control mode is switched over to the manual control mode, the copy lamp light volume is automatically adjusted to a mean value of the light volume for the last automatic control mode copying operation. It may be possible to design the light exposure controller so that the copy lamp light volume is automatically reset to the medium value when the automatic control mode is switched over to the manual mode. That is, LED 5 (the middle indicator) is lit and the copy lamp light volume is controlled by the corresponding line voltage. Suppose the original document 5 is copied in the automatic control mode and that the resultant image on the copy is thin or of a light density at the character portion. In such a case, a copy of adequate density would not be obtained with the automatic control mode. It is necessary to switch over the automatic control mode to the manual control mode and adjust the copy lamp light volume by operating the "+" key 7*a* or "−" key 7*b*. If the copy lamp light volume has been reset to the medium value, however, it is difficult for the operator to determine where the copy lamp light volume has been set in the last automatic control mode copying operation. In other words, it is impossible to determine which of the keys 7*a* and 7*b* should be operated and the extent of the adjustment for the manual control mode copying operation. According to the present invention, a mean value "Di" of the reflected light amount as indicated by a chain line 9 in FIG. 1 is calculated. The copy lamp light volume is then adjusted according to the calculated mean value, and the corresponding light volume indicator, say LED 4, is turned ON, when the automatic control mode is switched over to the manual mode. Therefore, if the entire image on the copy obtained in the automatic control mode is thin, adequate copy lamp light volume for the manual mode copying operation can be easily obtained by operating the "−" key 7*b* so as to reduce the light volume.

Figure 2:
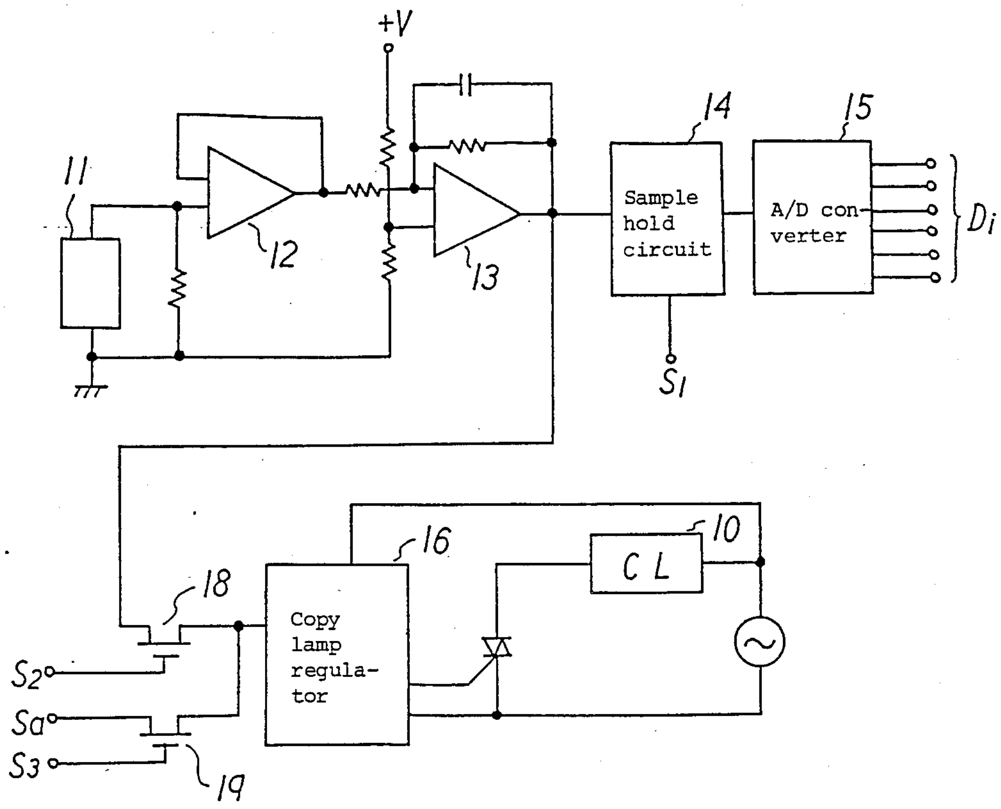
FIG. 2 is a block diagram of the circuit related to the automatic light exposure control according to the present invention.

FIG. 2 is a block diagram of an example of the automatic light exposure control circuit related to the present invention. Referring to the figure, 10 is the copy lamp for illuminating the original document 5, and 11 is the silicon blue cell for receiving light reflected by the original document 5 and automatically adjusting the copy lamp light volume in illuminating the original document 5, as described above with the reference to FIG. 1.

The silicon blue cell 11 receives light reflected by the original document 5 and outputs voltage proportional to the light amount received. The curve 8 of FIG. 1 represents an example of the voltage output. As understood from the curve 8, the voltage increases with the reflected light amount. The voltage outputted from the silicon blue cell 11 is inputted to an impedance transforming amplifier 12 for impedance transformation and then to a signal amplifier 13. The amplified signal is then transmitted to a sample hold circuit 14 and to an analog switch 18. The sample hold circuit 14 holds signals outputted from the amplifier 13 whenever it receives a signal S1 from a micro-processor as described in hereinafter. The signal held in the sample hold circuit 14 is outputted to an A/D converter 15 where the analog signal for the reflected light amount is converted to an n-bit digital signal Di before being inputted to the microprocessor. Meanwhile, the analog signal for the reflected light amount outputted to the analog switch 18 is inputted to a copy lamp regulator 16 under control of a signal S2 sent from the micro-processor. An analog signal Sa is also inputted through an analog switch 19 to the copy lamp regulator 16 under control of a digital signal S3 sent from the micro-processor. The illuminance of the copy lamp 10 illuminating the original document 5 is controlled according to the analog signal Sa inputted to the copy lamp regulator 16.

Figure 3:
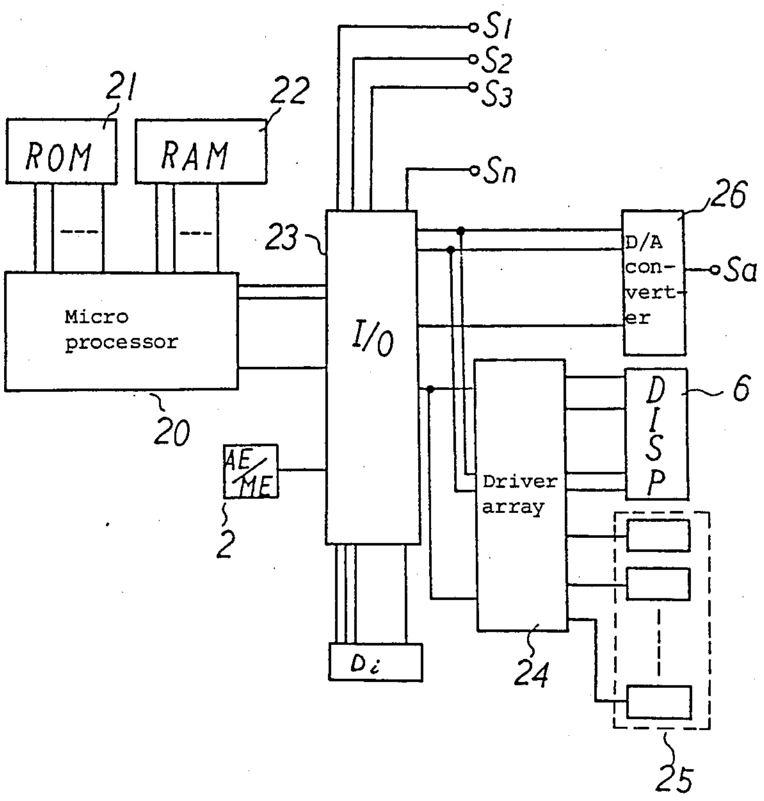
FIG. 3 is a block diagram of the control circuit of the copying machine related to the present invention.

FIG. 3 is a block diagram of a copying machine incorporating the light exposure controller of the present invention. ROM 21, RAM 22 and I/O interface 23 are connected to the micro-processor 20. The operation of the micro-processor 20 is controlled through an internal bus by a program stored in the ROM 21. Input and output data are stored and the working area is allocated in the RAM 22. The auto/manual control mode selector switch 2 shown in FIG. 1 is connected to the I/O interface 23. The digital signal Di corresponding to the light amount received by the silicon blue cell 11 is outputted from the A/D converter 15 into the I/O interface 23 which in turn outputs the signals S2 and S3 to the sample hold circuit 14. The I/O interface 23 also outputs the signal Sa through a D/A converter 26 to the analog switch 19. The display 6 and various loads of the copying machine are also connected via a driver array to the I/O interface 23.

The signal S2 is outputted from the I/O interface 23 when the automatic control mode is selected by the selector switch 2. With the signal S2, the signal corresponding to the reflected light amount and amplified by the amplifier 13 is inputted through the analog switch 18 to the copy lamp regulator 16. The copy lamp regulator 16 then controls the copy lamp 10 on the basis of the signal input to secure the optimal light volume of the copy lamp 10 in illuminating the original document 5. The signal S3 is outputted from the I/O interface 23 when the manual exposure control mode is selected. With the signal S3, the analog signal Sa is inputted from the D/A converter 26 through the analog switch 19 to the copy lamp regulator 16. The digital signal inputted to the D/A converter 26 is produced by the manual adjusting "+" key 7*a* or "−" key 7*b* shown in FIG. 1. Accordingly, the digital signal should correspond to one of the light volumes indicated by LED 1∼LED 9 of the display 6. If LED 5 is turned ON, for instance, the digital signal corresponding to LED 5 is inputted to the D/A converter 26.

The signal S1 is outputted from the I/O interface 23 when the automatic control mode is selected. With the signal S1, analog signals from the amplifier 13 are temporarily held in the sample hold circuit 14 to obtain the mean value of the entire light amount reflected by the original document 5. As shown in FIG. 1, assuming the scanning time is "t", the signal S1 is inputted to the sample hold circuit 14 at intervals of "$t_1$" (e.g. 10 msec) for holding signals outputted from the amplifier 13. It is obvious that the mean value of the reflected light amount is more accurate as the time "$t_1$" is shorter. The signal held in the sample hold circuit 14 is then outputted to the A/D converter 15 to be converted to a digital signal Di. The mean value $\overline{Di}$ of the entire light amount reflected by the original document 5 can be easily obtained by the following equation:

$$\overline{Di} = \frac{(i-1)\,\overline{Di-1} + Di}{i} \qquad (i = 1 \sim n)$$

According to the above equation, the mean value of the current total reflected light amount is calculated at intervals of "$t_1$".

Alternatively, the mean value may be calculated by dividing the sum of the reflected light amounts sampled and stored at intervals of "$t_1$" by the number of samples "n". This option requires memory regions of the number corresponding to the total number of samples "n", resulting in a larger memory size than the former method employed in the present invention.

Figure 4:
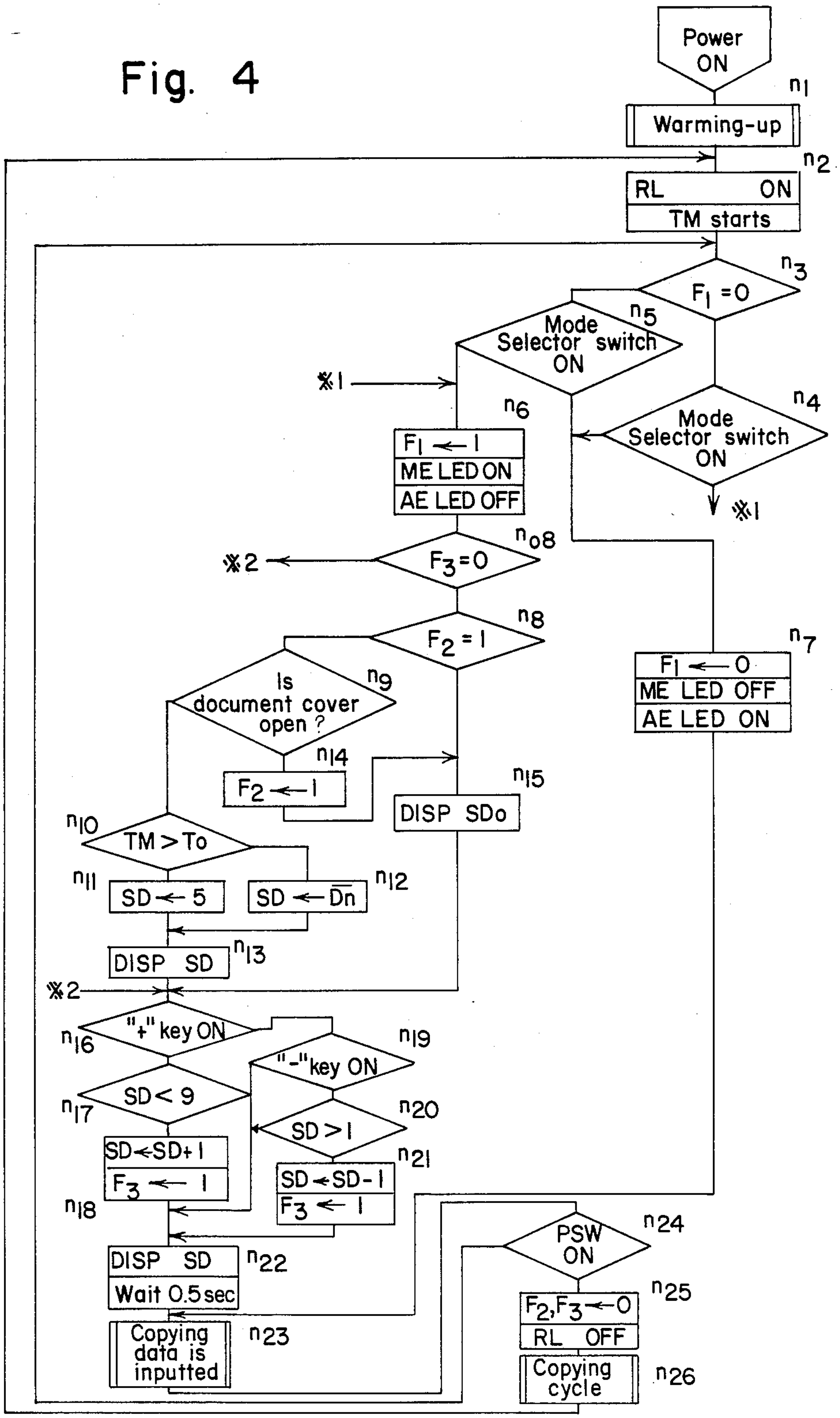
FIGS. 4 and 5 are flow charts showing the light exposure control sequence according to the present invention.

The control procedure with the light exposure controller is now described with reference to the flow charts in FIGS. 4 and 5.

When the copying machine is turned ON, initial setting and warming-up are carried out in the copying machine (Step n1). When the image fixing section of the copying machine has been heated to a specified temperature, the READY lamp illuminates an ON indicator, indicating that the copying machine is ready for operation and the timer TM starts counting (Step n2). The timer TM will be described more fully later.

Then, it is checked if the program flag F1 is set at "0" in Step n3. The flag F1 indicates the exposure control mode of the copying machine. With the initial setting, the copying machine is set for the automatic control mode and therefore, the flag F1 is set at "0". So, the control program proceeds to Step n4 where it is checked if the mode selector switch 2 is operated or not. If the switch 2 is operated, the program proceeds to Step n6 where the flag F1 is set at "1" and MANU mode indicator 3 (LED) is turned ON while AUTO mode indicator 4 (LED) is turned OFF. Meanwhile, if the mode selector switch 2 is depressed in the manual control mode, the program proceeds from Step n5 to Step n7 where the flag F1 is set at "0" and the MANU mode indicator 3 is turned OFF while the AUTO mode indicator 4 is turned ON.

In the manual control mode, the program proceeds from Step n6 to Step n08 to check that the flag F3 is set at "0". When the manual adjusting "+" key 7*a* or "−" key 7*b* is depressed once for adjusting the copy lamp light volume, the flag F3 is set at "1" and the copy lamp light volume thus adjusted is retained. With the initial setting, the flag F3 is set at "0". In Step n8, it is checked if the flag F2 is set at "1". When copying operation is started by operating the print switch, the flag F2 is set at "0". When the document cover is opened to replace the copied document with a new one, the flag F2 is set at "1". With the initial setting, the flag F2 is set at "0".

Then, the program proceeds to Step n9 to check if the document cover is opened or not. Since the document cover is not open in the present case, the program proceeds to Step n10 where it is checked if the timer TM counts up to the prescribed time "$T_0$". The timer TM functions when the automatic control mode is switched over to the manual mode. Assuming the time "$T_0$" is set at 20 sec, if the timer TM has counted beyond 20 sec, the program proceeds to Step 11 where the medium value "5" is inputted to the illuminance setting index SD in the copy lamp regulator 16 so that LED 5 in the middle of the display 6 is turned ON. Alternatively, if the timer TM has not counted to 20 sec, the program proceeds to Step n12 where data corresponding to the mean value $\overline{Dn}$ calculated in the last automatic control mode copying operation is inputted in the illuminance setting index SD, so that the corresponding LED of the display 6 is turned ON. For initial operation, since the mean value $\overline{Dn}$ has not been calculated by this time, the medium value "5" is inputted to SD and LED 5 of the display 6 is turned on in Step n12.

In Step n13, the appropriate LED of the display 6 is turned ON in accordance with the information inputted in the illuminance setting index SD. In the present case, LED 5 is turned ON, indicating that the copy lamp light volume is adjusted to the medium value. Based on the indication on the display 6, the operator can determine the most adequate copy lamp light volume for the original document 5 and operate an appropriate manual adjusting key 7 to obtain a desired light volume. If the "+" key 7*a* is operated in Step n16, it is checked in Step n17 to determine if the light volume presently indicated on the display 6 is the maximum allowed for the copying machine. If not, "1" is added to the current illuminance setting index value and the sum is inputted to the SD. If "−" key 7*b* is operated in Step n19, it is checked in Step n20 to determine if the light volume presently indicated on the display 6 is the minimum allowed for the copying machine. If not, "1" is subtracted from the present illuminance setting index value and the result is inputted to the SD in Step n21. If it is determined in Step n17 of Step n20 that the present copy lamp light volume is the maximum or the minimum allowed for the copying machine, or if no key is operated for manual light volume adjustment, the program proceeds to Step n22 with the value "5" retained for the illuminance setting index SD. The SD value is shown on the display 6. When the SD value is "5", for instance, LED 5 is illuminated. After 0.5 sec, the program proceeds to Step n23 in which copying data such as the number of copies and the copy paper size are inputted.

In Step n24, it is checked if the print switch (PSW) is depressed. If the PSW is not depressed at this time, the program returns to Step n3. In Step n18 or n21, the flag F3 is set at "1". When either of the manual adjusting keys 7 is operated for light volume adjustment, the adjusted new illuminance setting index SD is kept unchanged. Therefore, in the manual control mode, when the program proceeds through Steps n3, n5, n6 and n08 to Step n22, it returns to Step 16, with the illuminance setting index value shown on the display 6 in Step n22 being maintained. When either of the manual adjusting keys 7 is operated again, the above operation process is repeated.

When the PSW is depressed ON in Step n24, the program proceeds to Step n25 where the flags F2 and F3 are set at "0" and the READY lamp goes OFF. Then, the copying operation starts. The data corresponding to the indication on the display 6 is inputted to the D/A converter 26 which outputs the corresponding analog signal through the analog switch 19 to the copy lamp regulator 16 whereby the copy lamp 10 is operated with the light volume in accordance with the indication on the display 6. When the copying cycle is completed, the program returns to Step n2 and READY lamp lights ON. When another original document is to be copied, the operator opens the document cover to replace the old document with a new one. Since it is determined in Step n9 that the cover is opened, the program proceeds to Step n14 and the flag F2 is set at "1". In Step n15, the same illuminance setting index value as in the last copying operation is shown on the display 6. Then, the program proceeds to Step n16. Therefore, the previously described operation is repeated.

Operation of the light exposure controller of the present invention in the automatic control mode is as follows. When the automatic control mode is selected, the program proceeds to Step n7 where the flag F1 is set at "0" and MANU mode indicating LED 3 is turned OFF while AUTO mode indicating LED 4 is turned ON. Then, the program proceeds to Step n23 where necessary copying data is inputted. In Step n24, it is determined if the print switch (PSW) is operated or not. If it is determined that the print switch is operated, the READY lamp goes OFF in Step n25 and the copying cycle starts in the automatic control mode.

Figure 5:
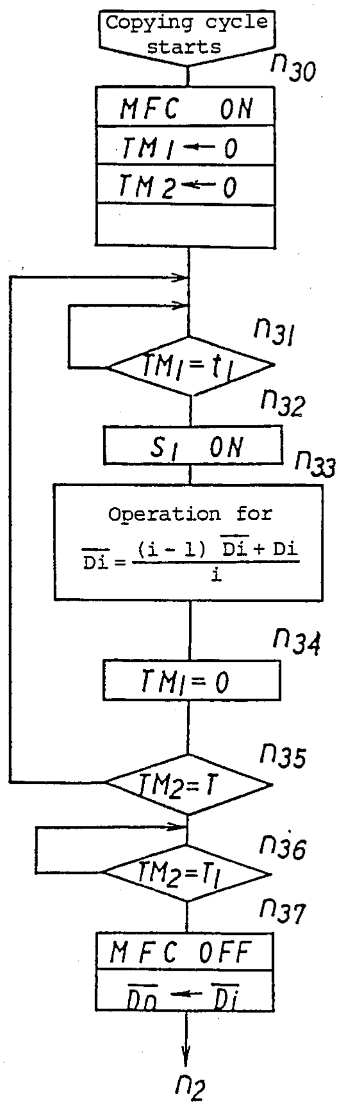

The flow chart of FIG. 5 shows the control sequence during the copying cycle. When the copying cycle starts, a mirror feed clutch (MFC) is turned ON for scanning the original document 5. Simultaneously, the copy lamp 10 also moves in parallel with the document 5. Consequently, a latent image of the original document 5 is sequentially formed by the optical means on the photoreceptor. Meanwhile, the silicon blue cell 11 catches the light reflected by the original document 5 and controls the light volume of the copy lamp 10 according to the reflected light amount, so that the copy lamp 10 is operated with the optimal light volume. When the mirror feed clutch is turned ON, timers $TM_1$ and $TM_2$ are set for initial values and start counting. The timer $TM_1$ is used for sampling. It counts the time "$t_1$" (e.g. 10 msec) for the document scanning time "$t_n$" shown in FIG. 1. The timer $TM_2$ counts the time for scanning the entire document 5. When the time set for the timer $TM_2$ elapses, the scanning means return to the home position. In Step n31, it is checked if the timer $TM_1$ counts up to "$t_1$" or not. If it is determined that the timer $TM_1$ has counted up to "$t_1$", a signal S1 is outputted in Step n32. That is, a signal based on the output from the silicon blue cell 11 is held by the sample hold circuit 14. The signal held in the circuit 14 is sent to the A/D converter 15 which outputs the digital signal Di corresponding to the current light amount reflected by the document 5.

Then, the operation of the equation shown in Step n33 is executed, using the digital signal Di outputted from the A/D converter 15. The operation calculates the mean value of the samples at intervals of "$t_1$". After the operation, the timer $TM_1$ is set for the initial value in Step n34. Then, in Step n35, it is checked if the timer $TM_2$ counts up to "T", that is, if the entire document 5 has been scanned. The above operation is repeated until the timer $TM_2$ counts up to "T". "T" is the time required for scanning an original document and is obtained by well-known document size detecting means or by inputting the document size. Therefore, the value set for "T" depends on the document size.

When it is determined in Step n35 that the entire document 5 has been scanned, the picture density mean value $\overline{Di}$ of the entire original document 5 is calculated by the operation in Step n33. Then, the program proceeds to Step n36 where the timer $TM_2$ is checked to see if the time set for mirror feeding elapses. If it is determined that the mirror feeding time elapses, the mirror feed clutch is turned OFF and the calculated picture density mean value $\overline{Di}$ is temporarily stored (Step n37).

When the above copying cycle is completed, the program returns to Step n2. If the resultant copy made in the automatic control mode is thin, particularly in the photographic area 5*a*, the original document 5 may be copied again in the manual control mode. To this purpose, the mode selector switch 2 is depressed to select the manual exposure control mode. The program proceeds through Steps n6, n08 and n8 to Step n9 where it is checked if the document cover is open. At this time, the document cover should be closed because the original document 5 is not to be replaced with a new one. The program proceeds to Step n10 where it is checked if the timer TM counts up to 20 sec. In general, when the resultant copy density is found to be inadequate, it is assumed that the operator operates the mode selector switch 2 immediately after he decides to copy the document again in the mammal control mode. Therefore, the mode selector switch 2 is probably depressed within 20 sec after the timer TM starts counting.

If the resultant copy density is found to be proper, the mode selector switch 20 will not be depressed within 20 sec and it may instead be operated for some reason after 20 sec or later. In the present case, however, the count of the timer TM does not exceed 20 sec. Therefore, the program proceeds to Step n12 where the mean value $\overline{Dn}$ calculated to determine the copy lamp light volume for the original document 5 during the automatic control mode copying operation is stored in the illuminance setting index SD. For instance, LED 4 is turned ON in accordance with the mean value $\overline{Di}$ as shown in FIG. 1. If the copy density is thin, the light volume is assumed to be too high and it is necessary to operate the "−" key 7b to shift the indication from LED 4 to LED 3 (n16→n19→n20→n21→n22).

If the print switch is depressed after this adjustment, the original document 5 is copied in the manual control mode with the light volume corresponding to LED 3 on the display 6. As is apparent from the above description, according to the present invention, the copy lamp light volume can be more accurately set with simpler manual operation than the case where the light volume is reset at the medium value or at the value set for the last manual control mode copying operation when the automatic control mode is switched over to the manual control mode.

The mode selector switch 2 may be operated to select the manual control mode 20 sec or longer after the automatic control mode copying operation is completed. In such a case, the data corresponding to the mean density value is not inputted in the illuminance setting index SD. Instead, the medium value "5" is inputted.

According to the present invention, as understood from the above, when the automatic control mode is switched over to the manual control mode, the copy lamp light volume is set at the mean value of the light volume for the last automatic control mode copying operation. Therefore, an optimal copy lamp light volume can be accurately set by a simple manual operation, with reference to the copy obtained in the last automatic control mode copying operation.

While only certain embodiments of the present invention have been described, it will be apparent to those skilled in the art that various changes and modifications may be made therein without departing from the spirit and scope of the present invention as claimed.

What is claimed is:

1. A light exposure controller, comprising:

a lamp for illuminating an original document on a copy document table;

means for detecting a quantity of light reflected by said original document;

means for controlling a light volume of said lamp according to the detected quantity of light; and mode selector means for selecting either of an automatic or manual exposure control for said lamp, wherein the light volume is set at a mean value of the light volume for the most recent automatic control mode copying operation when the automatic control mode is switched over to the manual mode.

2. The light exposure controller according to claim 1, wherein said means for detecting the quantity of light reflected by the original document is a silicon blue cell.

3. The light exposure controller according to claim 1, further including a sample hold circuit for holding signals outputted from the means for detecting and means for obtaining a mean value of said holding signals representative of the mean value of the light volume for the most recent automatic control mode copying operation.

4. The light exposure controller according to claim 3, further including means for outputting control signals to the sample hold circuit and controlling the accurate detection of the reflected light amount.

* * * * *